United States Patent [19]

Burchart

[11] Patent Number: 4,586,903
[45] Date of Patent: May 6, 1986

[54] MEANS FOR GENERATING A TACTILE CHARACTER FIELD

[75] Inventor: Joachim Burchart, Schlangen, Fed. Rep. of Germany

[73] Assignee: Nixdorf Computer AG, Paderborn, Fed. Rep. of Germany

[21] Appl. No.: 688,584

[22] Filed: Jan. 3, 1985

[30] Foreign Application Priority Data

Jan. 3, 1984 [DE] Fed. Rep. of Germany ....... 3400094

[51] Int. Cl.[4] .............................................. G09B 21/02
[52] U.S. Cl. .................................................... 434/114
[58] Field of Search ....................... 434/112, 113, 114; 364/523; 346/21; 340/407

[56] References Cited

U.S. PATENT DOCUMENTS

| | | | |
|---|---|---|---|
| 3,197,889 | 8/1965 | Micropoulov | 434/113 |
| 3,594,787 | 7/1971 | Ickes | 434/114 X |
| 3,624,772 | 11/1971 | Grunwald | 434/114 X |
| 3,736,672 | 6/1973 | Skewis | 434/114 |
| 4,475,162 | 10/1984 | Kitamura | 364/523 |
| 4,504,825 | 3/1985 | Bergermann | 364/523 X |

Primary Examiner—William H. Grieb
Attorney, Agent, or Firm—Krass & Young

[57] ABSTRACT

An apparatus for reading by blind persons comprising a data medium in the form of a thick elastic belt and having formed therein a dense uniformly spaced two-dimensional array of data elements of thin membrane-like construction integral with the belt and capable of assuming stable convex and concave conditions wherein they either project upwardly from the belt to be sensible by a person's finger or down into the belt where they may not be felt. Because of the thickness of the belt, the data elements are also capable of assuming intermediate unstable conditions wherein they do not experience a transition to the opposite state simply because they are compressed flush with a surface of the belt. Means are provided for setting and resetting the data areas.

8 Claims, 14 Drawing Figures

MEANS FOR GENERATING A TACTILE CHARACTER FIELD

This application is related to copending application Ser. No. 688,583 filed Jan. 3, 1985 in the name of Joachim Burchart and assigned to Nixdorf Computer AG of Paderborn, West Germany.

TECHNICAL FIELD

The invention relates to a unit for generating fields of tactile characters.

Such units are used for example as reading tables which can be written in Braille print and cleared again. The single character elements in general are combined into character groups which serve for displaying letters, numbers or the like. A plurality of character groups yields one line, a plurality of lines one page.

BACKGROUND ART

A unit of the type of the species is already known in which the character elements are made in the form of fingers supported movably in the table perpendicularly to the plane of the table, which fingers are movable between a set position projecting out of the table place and a cleared position retracted into the plane of the table by means of pistons which are arranged on the side faces of the table and are respectively movable perpendicularly to the direction of motion of the fingers (German Offenlegungsschrift No. 2,848,852). The operating pistons are made in the form of plungers which are respectively movable by magnet coils. The extremely expensive construction in which the operating pistons are arranged perpendicularly to the direction of motion of the fingers was chosen in order to be able to hold the fingers firmly in their set position by mechanical means without any holding current having to flow in the magnet coil for example. This has the result that each operating piston must have assigned to it either two separate magnet coils or one magnet coil operable in two effective directions for the setting and clearing of the fingers. The operating pistons arranged perpendicularly to the direction of motion of the fingers occupy a very large mounting space, so that for this reason alone any multi-line coverage of a reading table is not possible in practice. Besides this, in a general way in the known construction the expense for actuating means, operating means and the high electrical output required for operating the magnets is very disadvantageous, so that for this reason too only a comparatively small number of character fields can ever be combined on one reading table; in the case of the known construction as many charcter fields were chosen as were necessary for the display of one line of type of a computer viewing screen unit. The reproduction of multi-line texts, columns of figures, tables or large-area graphic patterns is not possible with character elements of the known type at a justifiable cost.

DISCLOSURE OF THE INVENTION

It is the problem of the invention to create a unit of the type of the species which is very much simpler in construction and is such that it is also suitable for displaying multi-line texts, whole text pages, tables, large-area graphic patterns and the like.

It is known that the cap-like knobs can assume two stable positions, namely the projecting position, in which they distinctly protrude out of the plane of the reading table, and a retracted position in which they are more or less retracted into the plane of the reading table, so that they cannot be detected by the reading person or else are distinctly detected as being cleared. By choosing the type or strength of the material it can readily be achieved that the knobs in their set position withstand the ordinary feeling pressure applied in reading without springing into their cleared position. For learner readers a higher material strength may be used for example.

The means for setting and clearing the knobs may be made in the form of quite simple pistons acting perpendicuarly to the table plane or the like, which pistons do not enlarge the line width in any way and therefore do not interfere with a dense coverage of the reading table, as will be explained further below. Besides this these pistons need have only a relatively short stroke, depending on the shaping of the knobs, since when the knobs reach a certain unstable intermediate position, they spring into their stable final position by themselves.

In order to differentiate the set position of the knobs from the cleared position as distinctly as possible, it is necessary that these be retracted as far as possible into the table plane in their cleared position. Therefore in one development of the invention it is provided that the knobs are arranged respectively over recesses formed in the table and penetrating through the latter which receive the knob partially or wholly in its retracted position.

It is also provided according to the invention that the knobs are respectively arranged on the inner faces of these recesses at their upper edge and displaced inward. It can be shown that in this way an arrangement can be found by which it is not possible to press the knobs far enough with the finger that they spring into their cleared position.

In a preferred development of the invention the knobs are made integral with the table. Materials which may be considered for this are rubber, plastic or the like for example.

Since the knobs maintain their stable positions quite independently of any support by the pistons for setting or clearing, it is not required that each character element have its type of piston permanently assigned to it, as is the case with the known solution. Rather, according to the invention it is sufficient for a plurality of knobs to be able to be set or cleared respectively one after another by a piston arranged to be movable relatively to the table. Theoretically it is sufficient to have one piston for setting and one piston for clearing, which can respectively sweep over the whole table, where either the piston is arranged stationary and the table movable or vice versa.

However, in a preferred embodiment of the invention, for example, at least one row of pistons is provided under the table and aligned in the direction of the knob columns with a number of pistons corresponding to the number of lines and arranged in the line spacing, which is provided for the setting of the knobs; by a stepwise further motion of the table in the line direction, all of the knob columns can be set one after another until the whole page is written. The pistons may also be arranged in the line direction, for which the table must be moved stepwise in the column direction. Also, a plurality of parallel rows of pistons may be provided, in which case the table must be moved in jumps of a plurality of line spaces or column spaces.

A clearing roller is provided according to the invention for the clearing, which rolls down in the line direction or the column direction relative to the top side of the table and is equipped with projections, where the projections are arranged on the developed surface of the clearing roller in accordance with the matrix pattern of the knobs, as is described in detail further on.

In a preferred embodiment example of the invention, the table is made in the form of an endless drivable belt guided over deflector rollers, which belt in the reading region is guided over a solid backing plate or the like, for which the rows of pistons for setting the knobs are arranged stationary. This belt can either be moved in the line direction, wherewith preferably the belt is brought to a stop after writing one page for reading; but it can also be moved in the column direction, wherewith it can be continuously written anew and be read by lines. The clearing is done automatically during the further movement of the belt through a clearing roller lying against the returning side of the belt and equipped with clearing projections. This roller or else the deflection rollers may be drivable and take over the conveying movement of the belt.

According to the invention the knobs are arranged on the table or the belt in a Braille code with at least one but preferably a plurality of Braille lines forming a Braille page. In order to be able to display not only letters and numbers but also graphic symbols approximately according to the type developed for video text and viewing screen text reproduction, it is further provided according to the invention that the knobs are arranged in a dense matrix with a uniform line and column spacing, wherewith respectively individual character fields can be combined as Braille forms which respectively are surrounded by sectors of one or a plurality of knob lines or knob columns. In a preferred development of the invention, an eight-point Braille code is provided when each Braille form is surrounded by a knob frame formed by two knob line sectors or two knob column sectors. The whole reading area therefore can be conceived of as being divided into a number of fields corresponding to the number of Braille forms, which fields respectively include a matrix of four times six points. Each of these fields is composed of an eightpoint Braille form as well as a one-row frame, as will be explained in detail below. Accordingly, two adjacent Braille forms are separated from each other by two rows of knobs. For the reproduction of letters and numbers only the Braille forms are set. For the reproduction of graphic symbols the whole character field can be used.

The unit according to the invention may advantageously be used as a unit for reproducing video text or viewing screen text. In order to transfer the displayed information e.g. a whole veiwing screen page, to the reading table, a control unit is provided according to the invention with a memory unit for storing at least the information corresponding to one table picture, a character generator for converting this information into the arrangement of a tactile character field as well as a control unit for the column-by-column or line-by-line setting of the character field knobs are provided. Moreover a control keyboard is connected with the control unit through which for example control commands for transferring at least the information corresponding to one table picture to the memory unit, for the transfer of this information from the memory unit to the table and for clearing the table can be input.

BEST MODE FOR CARRYING OUT THE INVENTION

Figure 1:
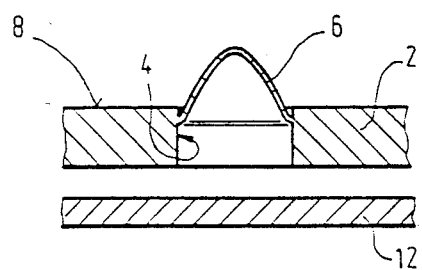
FIG. 1 shows a sector of a reading table with a character element in the set position in a lengthwise section.
Figure 2:
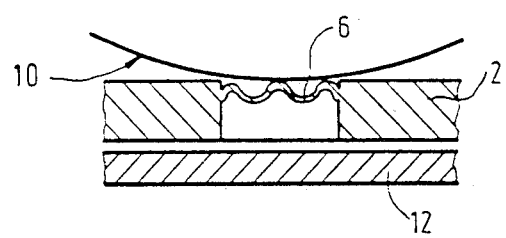
FIGS. 2 to 4 respectively show representations according to FIG. 1 in which the character element assumes different positions.
Figure 3:
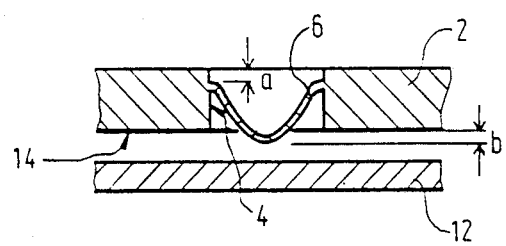

FIG. 1 shows a data medium in the form of an elastic-segment of a reading table 2 which, for example, may be made in the form of table bounded on all sides or else as an endless belt. In the reading table 2 are formed recesses 4 divided in the form of a matrix on the inner face of which are respectively arranged cap-like knobs 6 which, in the set position represented, project over the table plane 8. The reading table 21 and the knobs 6 are integral and made of an elastic material. The main portions of the data medium or table 2 are much thicker than the membrane-like elements or knobs 6 of the data areas and the knobs 6 are capable of assuming a dome-like configuration in both convex and concave conditions. As is hereinafter made clear, the knobs 6 may be "snapped" back and forth between the convex and concave conditions, both of which are stable. In addition, the knobs 6 can assume unstable intermediate conditions shown in FIGS. 2 and 4 in which they reside within the thickness of the medium 2. The cross section shape of the recesses 4 as well as of the knobs 6 is preferably circular. As shown in FIG. 3 in particular, the knob 6 is moved from the top edge downward by an amount inside the recess 4. In this way it is managed that the set knob is pressed downward by the finger 10 of the reading person, only a central region of the knob is pressed in, without the edge region determining the stable position being reset, as is seen particularly from FIG. 2. After the finger 10 is lifted off of the knob 6, this again projects out in its stable set position, so that the information to be imparted by the knobs is not lost.

Only when this is pressed in so far, by the operation of a piston acting on the knobs from the top, that even its edge region is reset does it reach the retracted position represented in FIG. 3, which corresponds to its stable cleared position.

Figure 4:
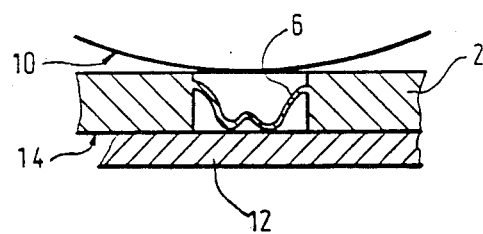

When, as in the embodiment example represented, the reading table 2 and the knobs 6 are made integral, then the reading table is also elastic, so that it can be pressed down by the reading person. In order to prevent too great a deflection which would impair the operability of the reading table, a solid backing plate 12 is provided below the reading table 2, in the reading region at least, on which plate the reading table 2 can be supported, as FIGS. 2 and 4 show. In order that a knob projecting over the bottom side 14 of the reading plate, which for example is of limited thickness by reason of material stress, will not be shifted into its set position due to the supporting of the reading table 2 on the backing plate 12, the knobs should project over the bottom side 14 by only an amount such that when the reading table 2 is in turn warped out of shape in only a central region, without their edge region altering the position determining the stable state of the knobs, as is seen in FIG. 4.

Figure 5:
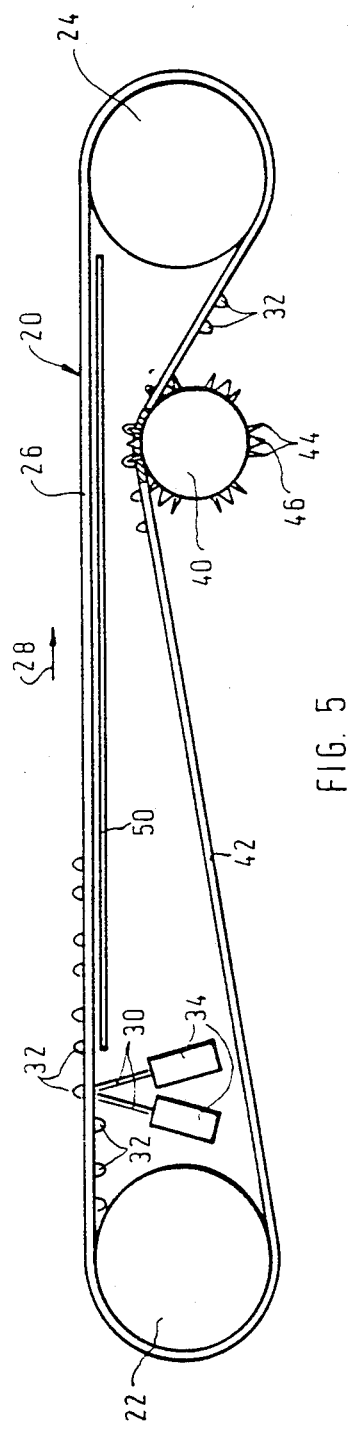
FIG. 5 shows a reading table made in the form of an endless belt in a side view, where the belt is movable in the line direction.

FIG. 5 shows a unit in which the reading table 20 is made in the form of an endless belt which runs over two deflector rollers 22,24. Under the upper side 26 of the belt, which represents the reading table proper, is arranged a row of pistons 30 which serve for setting the knobs 32 arranged on the belt 20. The pistons 30 are movable against the bottom side of the belt side 26, for example, by an electromagnetic drive 34. In order to be able to arrange the pistons in the densest possible row, they are alternatingly slightly displaced and tilted respectively with respect to one another. As FIG. 6 reveals, there are eight lines of knobs arranged in two groups of four knob lines each on the belt 20. Besides this, the knobs are also combined by columns to form groups of two knob columns each. In this way, individual character fields are respectively formed with two times four knobs, that is therefore with an arrangement corresponding to the eight-point Braille code. The embodiment example represented in FIG. 6 accordingly shows two Braille lines 36,38 lying one above the other. The pistons are arranged according to a knob column, i.e. there are eight pistons provided which are combined into two groups of four pistons each. In order to write on the reading table, this is moved stepwise and lengthwise in the direction of the arrow 28 along the pistons 30 arranged stationary, where the pistons write one column for each step until the whole page, consisting of two Braille lines 36,38, is written. This page can then be read.

A clearing roller 40 is provided for clearing the reading table, which roller rests against the returning side 42 of the belt 20 like a tension roller. The clearing roller can be driven in a known manner, which therefore is not represented further, so that the belt 20 with its upper belt side 26 can be moved further, in the direction of the arrow 28 for example. The clearing roller 40 is provided with projections 44 corresponding to the matrix pattern of the knobs 32, as can be seen particularly in FIG. 6. When the belt side 42 passes the clearing roller 40, all of the knobs 32 are retracted into their cleared position in this manner. In order to ensure an exact synchronization between the clearing roller 40 and the belt 20, the clearing roller 40 is provided with conveying teeth 46 which engage in a corresponding edge perforation 48 of the belt 20. The edge perforation 28 can also be scanned by photoelectric devices or the like and be used for the accurately timed driving of the piston 30. The knobs in their cleared position should project out only just far enough above the under side of the belt 20 so that they cannot be moved into their set position either by the deflector roller 22 or by the backing plate 40 arranged under the belt side 26 in the reading region.

Figure 6:
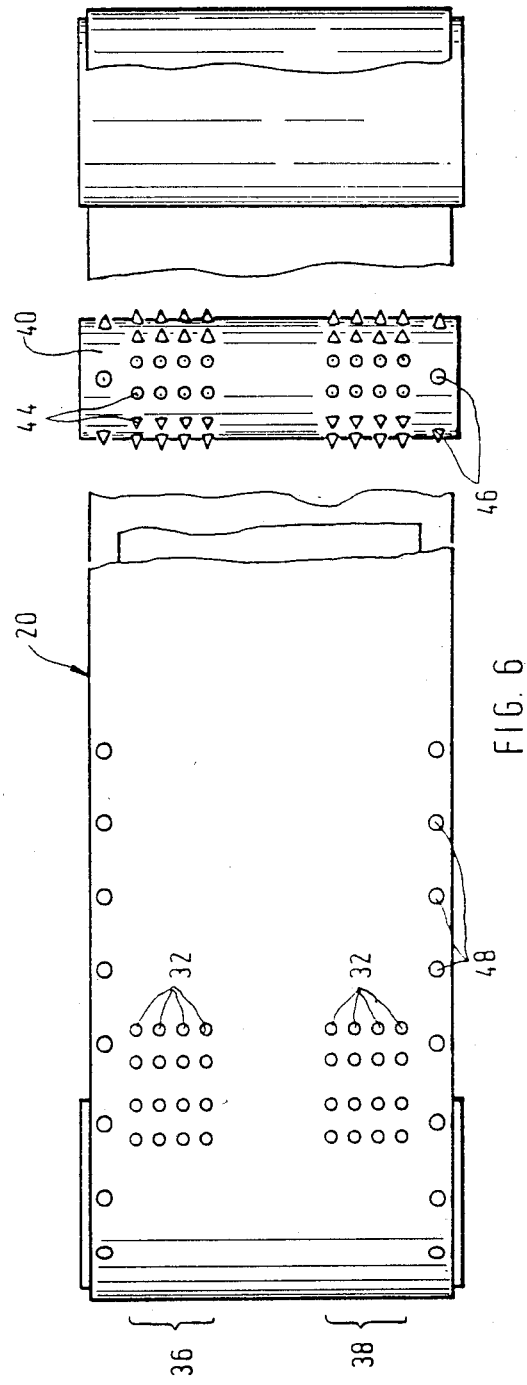
FIG. 6 shows a belt according to FIG. 5 in a top plan view.
Figure 7:
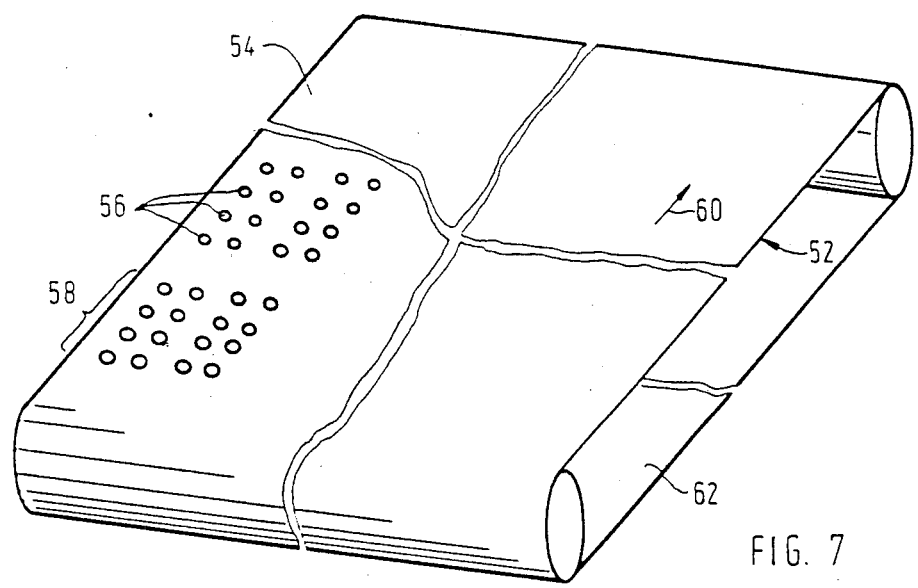
FIG. 7 shows a belt movable in the column direction.

FIG. 7 likewise shows a reading table 52 made in the form of a belt, which, in contrast to the reading table represented in FIGS. 5 and 6, is moved not in the line direction but in the column direction. Under the top belt side 54, moreover, there are also pistons provided for setting the knobs 56, according to the embodiment example represented in FIG. 6, such as need not be explained in detail. These pistons are arranged in a row which is aligned in the direction of a knob line and corresponds to the spacing and arrangement of the knobs. In this manner when the belt 52 is conveyed further stepwise, all of the knob lines are written one after another. After four conveying steps each, a Braille line 58 is written fully. With this arrangement, in contrast to the arrangement according to FIGS. 5 and 6, the reading table is written line by line and can be read at once, without the whole page first having to be written.

The conveying direction of the belt 52 serving as the reading table is preferably such that the upper belt side 54 moves in the direction of the arrow 60, so that the line 58 first presented to the reader is written in a manner favorable for reading without fatigue. The lines written remain readable until they move up out of the reading region and are cleared by a clearing roller lying against the lower belt side 62 in accordance with the arrangement according to FIG. 5.

Often in the viewing units of computers the newest information is respectively written in the topmost viewing screen lines; the text already written move downward out of the viewing region. If this manner of representation is to be transferred to a reading table for the blind, then the belt conveying motion must go from top to bottom, i.e. opposite the direction of the arrow 60.

Figure 8:
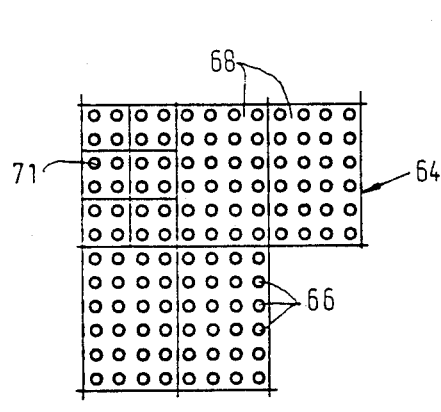
FIG. 8 shows a sector of a matrix of character elements.
Figure 9:
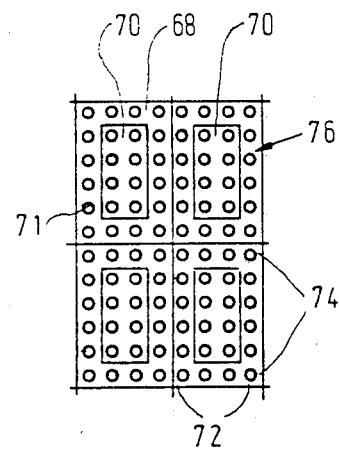
FIG. 9 shows a matrix according to FIG. 8 in which the fields for the display of Braille characters are recognizable.

FIG. 8 shows a sector of a reading table 64 in which the knobs 66 are arranged in a dense matrix with a uniform line and column spacing. This arrangement is mainly suitable for reproducing video text or viewing screen text displays which contain print and letter characters as well as graphic displays. The whole matrix can be thought of as being divided into fields 68 of four times 6 knobs, as is represented in FIG. 8. For representing letters and numbers in Braille code, only the inner character field 70 of each field 68 is used, which inner field ususally contains two times four knobs, as FIG. 9 shows. Each of the character fields 70 which corresponds to one Braille character is respectively surrounded by sectors 72 and 74 of one knob line and one knob column, which form one knob frame 76. Thus, the character fields 70 have a spacing between them of two rows of knobs, so that the individual Braille characters are distinctly separated from one another.

Figure 10:
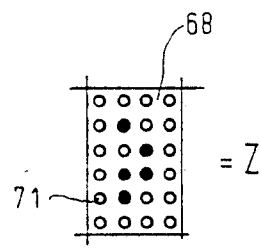
FIGS. 10 to 13 show various representations of graphic symbols on a field according to FIGS. 8 and 9.
Figure 11:
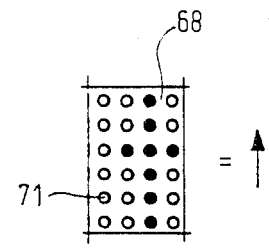

FIG. 10 shows the capital letter Z in Braille print, FIG. 11 a stylized arrow symbol.

Figure 12:
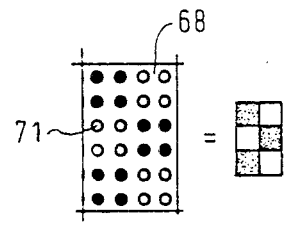
Figure 13:
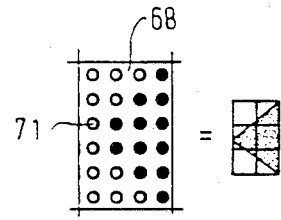

FIGS. 12 and 13 show as an example various graphic symbols of a video text display as well as their representation with the aid of a four-times-six knob field. Here the black points, for example, respectively correspond to set knobs. By enlarging the fields, i.e. by increasing the number of points per graphic symbol, the definition can be improved; an uneven number of lines and columns permits a symmetrical structure of a symbol with oblique lines (for this compare FIG. 13). Large-area graphic patterns can be achieved by also making use of the knobs of a plurality of fields 68.

Figure 14:
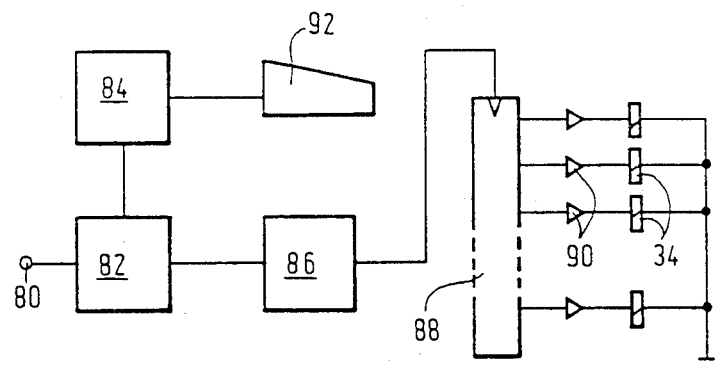
FIG. 14 diagrammatically shows a control unit for driving a unit for generating a tactile character field.

FIG. 14 diagrammatically shows a control unit for driving a reading table of the type described above. It is particularly used for transferring the information of one viewing screen page or the like to a tactile character field. For reproducing video text and viewing screen text, the viewing screen is divided into 24 lines of 40 characters each. The information contained in these characters is fed to a page memory 82 by way of the input 80 under the control of a microprocessor 84. After the conclusion of this input, the whole viewing screen page is loaded in the page memory 82. The corresponding information signals are converted in a character generator 86 into the corresponding character arrangement of the tactile character field. The character generator 86 emits the signals which, for example, were loaded in the page memory 82 character for character and line for line and arranged by knob lines or knob columns in a shift register 88; in an arrangement according to FIG. 6, for example, the single knob columns are set one after another. Whereas in an arrangement according to FIGURE 7, the knob lines are respectively set line for line, as has already been described. The way in which this is done is that after the loading of the shift register, by way of aplifiers 90, the drives are arranged by lines or by columns, are driven according to the code generated in the character generator 86. After the setting of one line or column, the belt is moved on by one step and the next line or column is set. In this way the whole page is written stepwise by advancing line by line or column by column.

A control keyboard 92 is connected with the microprocessor 84. With this keyboard, control commands can be input, for example, for transferring one viewing screen page to the memory unit, for transferring the content of the memory to the reading table, for clearing the reading table, for an enlarged display of part of a picture or for outputting a new viewing screen page in the unit.

I claim:

1. Apparatus for producing fields of tactile-sensible characters comprising:
    a data medium of first thickness defining opposite reading and bearing surfaces, said medium containing a two-dimensional array of spaced tactile data areas, the material thickness of the data areas being substantially less than the thickness of the medium;
    each of said data areas being formed of an elastic material of dome-like configuration and of sufficient rigidity to be stable in each of convex and concave conditions relative to said reading surface and capable of an over-center snap-action transition between said conditions; and
    each of said data areas being compressible from either of said conditions to an intermediate nonstable condition in which it is essentially flush with the surfaces of said medium without experiencing the over-center snap-action transition to the opposite condition.

2. Unit as claimed in claim 1 characterized in that the data areas (6) are made integral with the medium (2).

3. Unit as claimed in claim 1 further comprising a piston (30,44) arranged to be movable in the medium plane relative to the medium (20) whereby the date areas can be positioned between the convex and concave positions one after another as the medium is moved relative to the piston.

4. Unit as claimed in claim 1 wherein the medium is in the form of a flexible table (20) and the data areas are in the form of elastic knobs (32), the apparatus further comprising one row of pistons (30) for setting the knobs (32) is provided under the table (20) which row is aligned in the direction of the knob columns or knob lines, having a number of pistons movable against the under side of the table which number corresponds to the number of lines and is arranged in the line spacing or corresponds to the number of columns and is arranged in the column spacing, where the rows of pistons are movable relative to the table (26) in the line direction or in the column direction, respectively.

5. Unit as claim in claim 1 further comprising a clearing roller (40) for clearing the line direction or in the column direction relative to the top side of the medium and is equipped with projections (44) arranged according to the matrix pattern of the data areas (32).

6. Unit as claimed in claim 5 wherein the medium is in the form of a flexible table and the data areas are in the form of elastic knobs, said table (20,52) being made in the form of an endless drivable belt guided over deflector rollers (22,24) which belt in the reading region is guided over a solid backing plate (50) or the like, where the rows of pistons are arranged stationary.

7. Unit as claimed in claim 6 characterized in that the clearing roller (40) is made in the form of a stationary tension roller lying agnist the return sdie of the belt.

8. Unit as claimed in claim 1 wherein the data areas (32,56) are arranged in a Braille code with at least one or even a plurality of Braille lines forming a Braille page.

* * * * *